United States Patent
Bae et al.

(10) Patent No.: US 9,956,519 B2
(45) Date of Patent: May 1, 2018

(54) ABSORBENT FOR DESULFURIZATION OF COMBUSTION GAS AND METHOD OF TREATING COMBUSTION GAS USING THE SAME

(71) Applicants: Hyundai Motor Company, Seoul (KR); Kia Motors Corporation, Seoul (KR); Korea Institute of Energy Research, Daejeon (KR)

(72) Inventors: Shin-Tae Bae, Gyeonggi-do (KR); Yeoil Yoon, Daejeon (KR); Sungchan Nam, Daejeon (KR); Soonkwan Jeong, Daejeon (KR); Sungyeoul Park, Daejeon (KR); Ilsoo Chun, Daejeon (KR); Youngeun Kim, Daejeon (KR)

(73) Assignees: Hyundai Motor Company, Seoul (KR); Kia Motors Corporation, Seoul (KR); KOREA INSTITUTE OF ENERGY RESEARCH, Daejeon (KR)

(*) Notice: Subject to any disclaimer, the term of this patent is extended or adjusted under 35 U.S.C. 154(b) by 475 days.

(21) Appl. No.: 14/486,122

(22) Filed: Sep. 15, 2014

(65) Prior Publication Data
US 2015/0118136 A1 Apr. 30, 2015

(30) Foreign Application Priority Data
Oct. 31, 2013 (KR) .......... 10-2013-0131568

(51) Int. Cl.
*B01D 53/78* (2006.01)
*B01D 53/14* (2006.01)
(Continued)

(52) U.S. Cl.
CPC ....... *B01D 53/1493* (2013.01); *B01D 53/507* (2013.01); *B01D 53/60* (2013.01); *B01D 53/62* (2013.01); *F23J 15/006* (2013.01); *B01D 53/75* (2013.01); *B01D 2251/304* (2013.01); *B01D 2251/306* (2013.01); *B01D 2251/402* (2013.01);
(Continued)

(58) Field of Classification Search
None
See application file for complete search history.

(56) References Cited

U.S. PATENT DOCUMENTS 4,208,395 A * 6/1980 Gorin .................. C01B 17/05
423/243.08
4,217,238 A * 8/1980 Sartori ............... B01D 53/1493
252/189
(Continued)

FOREIGN PATENT DOCUMENTS

CN 102762293 A 10/2012
JP 06-210129 A 8/1994
(Continued)

*Primary Examiner* — Daniel Berns
(74) *Attorney, Agent, or Firm* — Mintz Levin Cohn Ferris Glovsky and Popeo, P.C.; Peter F. Corless

(57) ABSTRACT

An absorbent for desulfurization of combustion gas is provided. The absorbent includes about 1 to about 16 wt % of potassium carbonate ($K_2CO_3$); about 0.1 to about 10 wt % of a promoting agent including hindered cyclic amine, hindered cyclic amine bicarbonate, or a combination thereof; and a balance amount of water. In addition, a method of treating the combustion gas using the absorbent is provided.

5 Claims, 2 Drawing Sheets

(51) Int. Cl.
 B01D 53/50 (2006.01)
 B01D 53/56 (2006.01)
 B01D 53/60 (2006.01)
 B01D 53/62 (2006.01)
 B01D 53/75 (2006.01)
 B01D 53/77 (2006.01)
 F23J 15/00 (2006.01)

(52) U.S. Cl.
 CPC .. *B01D 2251/404* (2013.01); *B01D 2251/604* (2013.01); *B01D 2251/606* (2013.01); *B01D 2251/80* (2013.01); *B01D 2252/10* (2013.01); *B01D 2252/20442* (2013.01); *B01D 2252/20447* (2013.01); *B01D 2252/504* (2013.01); *B01D 2257/302* (2013.01); *B01D 2257/404* (2013.01); *B01D 2257/504* (2013.01); *B01D 2258/0283* (2013.01); *F23J 2215/10* (2013.01); *F23J 2215/20* (2013.01); *F23J 2215/50* (2013.01); *Y02C 10/04* (2013.01); *Y02C 10/06* (2013.01); *Y02E 20/326* (2013.01)

(56) References Cited

U.S. PATENT DOCUMENTS 8,496,895 B2 * 7/2013 Lee .................. B01D 53/60
  422/168
2013/0028820 A1   1/2013 Lee et al.

FOREIGN PATENT DOCUMENTS

JP          07-246313 A       9/1995
KR    10-2012-0087441 A       8/2012

* cited by examiner

ABSORBENT FOR DESULFURIZATION OF COMBUSTION GAS AND METHOD OF TREATING COMBUSTION GAS USING THE SAME

RELATED APPLICATIONS

This application claims priority to and the benefit of Korean Patent Application No. 10-2013-0131568 filed in the Korean Intellectual Property Office on Oct. 31, 2013, the entire contents of which are incorporated herein by reference.

TECHNICAL FIELD

The present invention relates to an absorbent for desulfurizing combustion gas and a method of treating the combustion gas using the absorbent.

BACKGROUND

As carbon dioxide recovery and storage technologies have been actively developed, technologies for capturing carbon dioxide have been established to be commercially available and have been applied to conventional power plant equipment for thermal power generation. In particular, since coal generates abundant carbon dioxide among other fossil fuels, such power plant using coal fuels mainly aims to decrease discharged amount of carbon dioxide. For example, the coal power plant may be equipped with a combustion gas treatment system and a desulfurization system to discharge combustion gas after removing about 90% of nitrogen compounds and sulfur-containing compounds therefrom by these systems.

However, since the sulfur-containing compounds and the nitrogen compounds may still remain in the combustion gas even after passing the denitrification and desulfurization systems, carbon dioxide absorbent byproducts may be produced when such combustion gas flows into a carbon dioxide capture equipment. Thus, the production of such byproducts may deteriorate efficiency and economic effects of treating the combustion gas.

The above information disclosed in this section is merely for enhancement of understanding of the background of the invention and therefore it may contain information that does not form the prior art that is already known in this country to a person of ordinary skill in the art.

SUMMARY OF THE INVENTION

One exemplary embodiment of the present invention provides an absorbent for desulfurizing combustion gas which is required for efficient operation of a carbon dioxide capture process by removing minor components remaining in a combustion gas and economical operation by preventing performance degradation during the long term operation. Another exemplary embodiment provides a method of treating combustion gas using the same absorbent.

In one exemplary embodiment of the present invention, an absorbent for desulfurization of a combustion gas may include about 1 to about 16 wt % of potassium carbonate ($K_2CO_3$); about 0.1 to about 10 wt % of a promoting agent including hindered cyclic amine, hindered cyclic amine bicarbonate, or a combination thereof; and a balance amount of water, based on the total weight of the absorbent for desulfurization.

In particular, the hindered cyclic amine may be selected from the group consisting of 1-amino-4-methyl piperazine, 1-(2-aminoethyl)-4-methyl piperazine, 1-(2-hydroxyethyl)-4-methyl piperazine, 1-(2-aminoethyl) piperazine, 1-(2-hydroxyethyl) piperazine, 2-aminoethyl piperazine, 1-ethyl piperazine, 2,5-dimethyl piperazine, cis 2,6-dimethyl piperazine, 1,4-dimethyl piperazine, trans 2,5-dimethyl piperazine, 1-methyl piperazine, 2-methyl piperazine, 1-ethyl piperazine, 2-piperidine ethanol, 3-piperidine ethanol, 4-piperidine ethanol, 2-aminoethyl-1-piperidine, homopiperazine, and a combination thereof. The hindered cyclic amine bicarbonate may be selected from the group consisting of 1-amino-4-methyl piperazinium bicarbonate, 1-(2-aminoethyl)-4-methyl piperazinium bicarbonate, 1-(2-hydroxyethyl)-4-methyl piperazinium bicarbonate, 1-(2-aminoethyl) piperazinium bicarbonate, 1-(2-hydroxyethyl) piperazinium bicarbonate, 2-aminoethyl piperazinium bicarbonate, 1-ethyl piperazinium bicarbonate, 2,5-dimethyl piperazinium bicarbonate, cis 2,6-dimethyl piperazinium bicarbonate, 1,4-dimethyl piperazinium bicarbonate, trans 2,5-dimethyl piperazinium bicarbonate, 1-methyl piperazinium bicarbonate, 2-methyl piperazinium bicarbonate, 1-ethyl piperazinium bicarbonate, 2-piperidinium ethanol bicarbonate, 3-piperidinium ethanol bicarbonate, 4-piperidinium ethanol bicarbonate, 2-aminoethyl-1-piperidinium bicarbonate, homopiperazinium bicarbonate, and a combination thereof.

In another exemplary embodiment of the present invention, a method of treating combustion gas may include: a denitrification process of removing nitrogen compounds from the combustion gas; a collecting process of collecting the combustion gas obtained after removing the nitrogen compound; a desulfurization process of removing minor components including sulfur-containing compounds using an absorbent for desulfurization from the collected combustion gas; and a carbon dioxide capture process of capturing carbon dioxide using a carbon dioxide absorbent from the combustion gas obtained after removing the minor components. In an exemplary embodiment, the absorbent for desulfurization may include: about 1 to about 16 wt % of potassium carbonate ($K_2CO_3$), about 0.1 to about 10 wt % of a promoting agent, and a balance amount of water, based on the total weight of the absorbent for desulfurization, and the promoting agent may include hindered cyclic amine, hindered cyclic amine bicarbonate, or a combination thereof. After the carbon dioxide capture process is performed for a predetermined period, a carbon dioxide absorbent byproduct different from the carbon dioxide absorbent may be obtained and moved on to the desulfurization process and thus, may be reused as the absorbent for desulfurization. In other exemplary embodiments, the carbon dioxide absorbent may include an amount of about 1 to about 16 wt % of an alkali carbonate salt, about 0.1 to about 10 wt % of hindered cyclic amine, and a balance amount of water, based on the total weight of the carbon dioxide absorbent. Further in another exemplary embodiment, the carbon dioxide absorbent may be different from the carbon dioxide absorbent byproduct, and the carbon dioxide absorbent byproduct may be substantially the same as the absorbent for desulfurization.

In addition, in another exemplary embodiment of the present invention, a method of treating combustion gas may include: a denitrification process of removing nitrogen compounds from the combustion gas; a collecting process of collecting the combustion gas obtained after removing the nitrogen compound; a desulfurization process of removing minor components including sulfur-containing compounds using a first absorbent for desulfurization from the collected combustion gas; a desulfurization reinforcing process of further removing the minor components including the sulfur-containing compounds using a second absorbent for desulfurization from the combustion gas obtained after the desulfurization process; and a carbon dioxide capture process of capturing carbon dioxide using a carbon dioxide absorbent from the combustion gas obtained after the desulfurization reinforcing process, wherein, the second absorbent for desulfurization may include about 1 to about 16 wt % of potassium carbonate ($K_2CO_3$), about 0.1 to about 10 wt % of a promoting agent, and a balance amount of water based on the total weight of the second absorbent, and the promoting agent may include hindered cyclic amine, hindered cyclic amine bicarbonate, or a combination thereof.

Further, after the carbon dioxide capture process is performed for a predetermined period, a carbon dioxide absorbent byproduct different from the carbon dioxide absorbent may be obtained and moved to the desulfurization reinforcing process and thus, used as a second absorbent for desulfurization. In particular, the carbon dioxide absorbent may include about 1 to about 16 wt % of an alkali carbonate salt, about 0.1 to about 10 wt % of hindered cyclic amine, and a balance amount of water based on the total weight of the carbon dioxide absorbent; the carbon dioxide absorbent may be different from the carbon dioxide absorbent byproduct; and the carbon dioxide absorbent byproduct may be substantially the same as the second absorbent for desulfurization. The first absorbent for desulfurization may be substantially the same as or different from the second absorbent for desulfurization. When the first absorbent for desulfurization is different from the second absorbent for desulfurization, the first absorbent for desulfurization may include calcium hydroxide, sodium hydroxide, magnesium hydroxide, or a combination thereof.

When the absorbent for desulfurization is used for treating combustion gas, efficient operation of a carbon dioxide capture process by removing minor components remaining in the combustion gas and economical operation by preventing performance degradation during the long term operation may be secured.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

DETAILED DESCRIPTION

Figure 1:
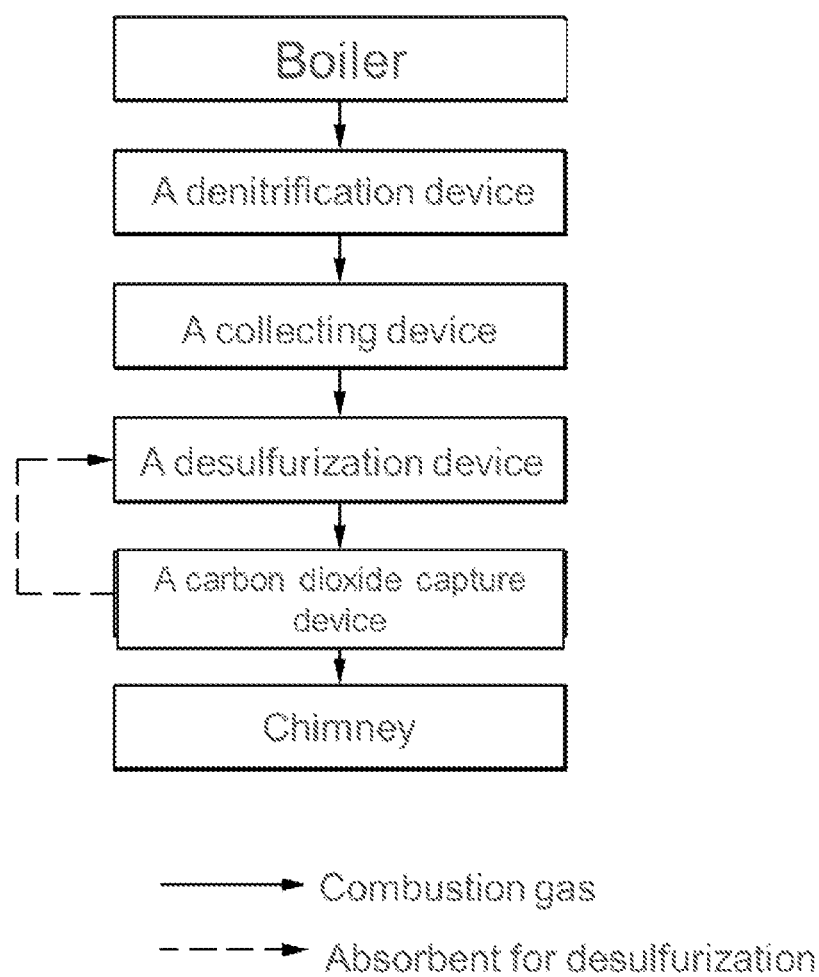
FIG. 1 illustrates each exemplary equipment of sequential process for treating combustion gas according to one exemplary embodiment of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, embodiments are described. However, the embodiments are exemplary, and the present invention is not limited and is limited by the scope of the claims.

According to one exemplary embodiment, an absorbent for desulfurizing combustion gas may include potassium carbonate ($K_2CO_3$), a promoting agent, and water, and the promoting agent which may include hindered cyclic amine, hindered cyclic amine bicarbonate, or a combination thereof. The absorbent for desulfurization may be used to desulfurize combustion gas and remove minor components remaining in the combustion gas, for example, $O_2$, halogens, and the like as well as sulfur-containing compounds such as $SO_2$. Accordingly, the carbon dioxide capture process may be performed more efficiently by performing a pre-treatment of removing the minor components which may influence on performance of the process before the combustion gas flows into the carbon dioxide capture process.

In one aspect, when potassium carbonate ($K_2CO_3$) is dissolved in water, a solution may become basic and pH of the solution may increase. Thus, the potassium carbonate may be neutralized with an oxygen component including $SO_2$ in the combustion gas. The potassium carbonate ($K_2CO_3$) may be included in an amount of about 1 to about 16 wt %, and or about 1 to about 15 wt % based on the total weight of the absorbent for desulfurization. When the potassium carbonate ($K_2CO_3$) is included within such range, the amount of the $SO_2$ may decrease down to about 3 ppm although only the neutralization occurs.

In some aspects, the promoting agent may be a rate-promoting agent reacting with the $SO_2$ and fast forming sulfate. In particular, hindered cyclic amine or hindered cyclic amine bicarbonate used as the promoting agent may include a compound variously bound with a substituent such as an alkyl group and the like to provide a steric hindrance effect in a center of a nitrogen atom which directly reacts with tiny quantity of $SO_2$, $O_2$, halogens, and the like.

In particular, the hindered cyclic amine may be selected from the group consisting of 1-amino-4-methyl piperazine, 1-(2-aminoethyl)-4-methyl piperazine, 1-(2-hydroxyethyl)-4-methyl piperazine, 1-(2-aminoethyl) piperazine, 1-(2-hydroxyethyl) piperazine, 2-aminoethyl piperazine, 1-ethyl piperazine, 2,5-dimethyl piperazine, cis 2,6-dimethyl piperazine, 1,4-dimethyl piperazine, trans 2,5-dimethyl piperazine, 1-methyl piperazine, 2-methyl piperazine, 1-ethyl piperazine, 2-piperidine ethanol, 3-piperidine ethanol, 4-piperidine ethanol, 2-aminoethyl-1-piperidine, homopiperazine, and a combination thereof. The hindered cyclic amine bicarbonate may be selected from the group consisting of 1-amino-4-methyl piperazinium bicarbonate, 1-(2-aminoethyl)-4-methyl piperazinium bicarbonate, 1-(2-hydroxyethyl)-4-methyl piperazinium bicarbonate, 1-(2-aminoethyl) piperazinium bicarbonate, 1-(2-hydroxyethyl) piperazinium bicarbonate, 2-aminoethyl piperazinium bicarbonate, 1-ethyl piperazinium bicarbonate, 2,5-dimethyl piperazinium bicarbonate, cis 2,6-dimethyl piperazinium bicarbonate, 1,4-dimethyl piperazinium bicarbonate, trans 2,5-dimethyl piperazinium bicarbonate, 1-methyl piperazinium bicarbonate, 2-methyl piperazinium bicarbonate, 1-ethyl piperazinium bicarbonate, 2-piperidinium ethanol bicarbonate, 3-piperidinium ethanol bicarbonate, 4-piperidinium ethanol bicarbonate, 2-aminoethyl-1-piperidinium bicarbonate, homopiperazinium bicarbonate, and a combination thereof.

In an exemplary embodiment, the promoting agent may be included in an amount of about 0.1 to about 10 wt %, or about 0.1 to about 2 wt % based on the total weight of the absorbent for desulfurization. When the promoting agent is included within such range, the content of the $SO_2$ may decrease down to about 3 ppm. The absorbent for desulfurization may include water and may be used as a liquid. The water may be included in a balance amount, or in an amount of about 73 to about 83 wt % based on the total weight of the absorbent for desulfurization. When the water is included within such range, a pipe clogging problem caused by a solid salt formed in desulfurizing process may be suppressed. Furthermore, such solid salt formed after using the absorbent for desulfurization is well dissolved in water and decomposed into an original reactant and thus, may be reused. Hereinafter, an exemplary method of treating a combustion gas by using the absorbent for desulfurization is illustrated with a reference to equipments in FIGS. 1 and 2. FIG. 1 illustrates each equipment of sequential process for treating combustion gas according to one exemplary embodiment of the present invention.

In one exemplary embodiment, as shown in FIG. 1, combustion gas discharged from a boiler may be moved to a denitrification device to perform a denitrification process of removing nitrogen compounds from the combustion gas. Then, the combustion gas obtained after removing the nitrogen compound may be moved to a collecting device to collect the combustion gas. Subsequently, the collected combustion gas may be moved to a desulfurization device to perform a desulfurization process of removing minor components including sulfur-containing compounds from the combustion gas. After the desulfurization process, the combustion gas obtained after removing the minor components may be moved to a carbon dioxide capture device to perform a capture process of capturing carbon dioxide from the combustion gas. Thereafter, the captured carbon dioxide may be compressed and stored, while the combustion gas is released through a chimney into the air. In addition, the minor components may be absorbed in the absorbent for desulfurization after the desulfurization process, and the solidified absorbent for desulfurization may be collected, burned, and discarded.

In some exemplary embodiments, in the desulfurization process, the above absorbent for desulfurization may be used to remove the minor components from the combustion gas. When the absorbent for desulfurization according to one exemplary embodiment is used for the desulfurization process, sulfur-containing compounds such as $SO_2$ may not only be removed from the combustion gas, but other minor components such as $O_2$, halogens, and the like remaining in the combustion gas may also be removed. Accordingly, since the minor components other than the sulfur-containing compounds may be removed before a carbon dioxide capture process, the carbon dioxide capture process may be more efficiently performed. Further, the absorbent for desulfurization may be separately prepared and flow into the desulfurization device.

In other exemplary embodiments, in the carbon dioxide capture process, a carbon dioxide absorbent may be used to capture carbon dioxide from the combustion gas, and when the carbon dioxide capture process is performed for a predetermine period, for example, for greater than or equal to about 1 month. During that period, a part of components of the carbon dioxide absorbent may be volatilized or deteriorated and lost, thereby producing a carbon dioxide absorbent byproduct which may be different from the carbon dioxide absorbent. Accordingly, the absorbent for desulfurization may be separately prepared, and also include the carbon dioxide absorbent byproduct, which may be discharged from the carbon dioxide capture device and moved to the desulfurization device as shown with the dotted arrow line in FIG. 1.

Therefore, in the exemplary embodiments, the carbon dioxide absorbent byproduct generated during long term operation of the carbon dioxide capture process and possibly having an influence on performance degradation may be reused in the desulfurization process and economical operation of treating the combustion gas. In particular, the carbon dioxide absorbent may include an alkali carbonate salt, hindered cyclic amine, and water, but have a different composition from the carbon dioxide absorbent byproduct. The alkali carbonate salt may be selected from the group consisting of potassium carbonate ($K_2CO_3$), sodium carbonate ($Na_2CO_3$), sodium hydroxide (NaOH), potassium hydroxide (KOH), potassium bicarbonate ($KHCO_3$), sodium bicarbonate ($NaHCO_3$), and a combination thereof. In exemplary embodiments, the alkali carbonate salt may be included in an amount of about 1 to about 16 wt %, or about 1 to about 15 wt % based on the total weight of the carbon dioxide absorbent. When the alkali carbonate salt is included within such range, the carbon dioxide absorbent may be used in a liquid and more easily delivered by suppressing production of solid salt, and the content of $SO_2$ may be lowered down to about 3 ppm. The hindered cyclic amine may be a compound having substitutents, such as an alkyl group and the like that is variously bound to a central nitrogen atom which directly reacts with carbon dioxide, thereby providing a steric hindrance effect.

In general, when a nitrogen atom of amine reacts with carbon dioxide, the carbon dioxide may be absorbed as a carbamate. When such amine is a secondary amine or a hindered cyclic amine, the carbon dioxide may be absorbed as a bicarbonate rather than the carbamate due to steric hindrance. In particular, when the hindered cyclic amine is mixed with an alkali carbonate salt, a part of the hindered cyclic amine may absorb carbon dioxide as the carbamate as shown in Reaction Scheme 1. Afterwards, alkali cations ($M^+$) of the alkali carbonate salt may provide a coulombic force to a part of amine molecules absorbed as a carbamate and promote the amine molecules to be present as a bicarbonate rather than the carbamate as shown in the following Reaction Scheme 2. Accordingly, reproduction energy may be sharply decreased. When only the hindered cyclic amine is present, the following Reaction Scheme 2 may not occur and may not decrease sufficient reproduction energy. Meanwhile, when the hindered cyclic amine is present with an alkali carbonate salt, the following Reaction Scheme 2 may occur and decrease reproduction energy sufficiently.

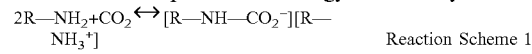

Reaction Scheme 1

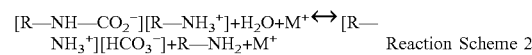

Reaction Scheme 2

In an exemplary embodiment, the hindered cyclic amine may be selected from the group consisting of 1-amino-4-methyl piperazine, 1-(2-aminoethyl)-4-methyl piperazine, 1-(2-hydroxyethyl)-4-methyl piperazine, 1-(2-aminoethyl)

piperazine, 1-(2-hydroxyethyl) piperazine, 2-aminoethyl piperazine, 1-ethyl piperazine, 2,5-dimethyl piperazine, cis 2,6-dimethyl piperazine, 1,4-dimethyl piperazine, trans 2,5-dimethyl piperazine, 1-methyl piperazine, 2-methyl piperazine, 1-ethyl piperazine, 2-piperidine ethanol, 3-piperidine ethanol, 4-piperidine ethanol, 2-aminoethyl-1-piperidine, homopiperazine, and a combination thereof. The hindered cyclic amine may be included in an amount of about 0.1 to about 10 wt %, or, about 0.1 to about 2 wt % based on the total weight of the carbon dioxide absorbent. When the hindered cyclic amine is included within such range, the content of $SO_2$ may be lowered down to about 3 ppm.

In other exemplary embodiments, the carbon dioxide absorbent may include water and may be used in a liquid state. The water may be included in a balance amount, or, in an amount of about 73 to about 83 wt % based on the total weight of the carbon dioxide absorbent. When the water is included within such range, the carbon dioxide absorbent may be more easily moved without production of solid salts. The carbon dioxide absorbent byproduct obtained after using the carbon dioxide absorbent for a predetermined period may be the same as the absorbent for desulfurization. In addition, the desulfurization process may be performed in the same method as the carbon dioxide capture process, or, in a gas-liquid absorption reaction method. The above liquid absorbent for desulfurization may be scattered and sprayed in the upper part of the desulfurization device, so that the absorbent may flow down on the larger surface area of the device, while the combustion gas is injected into the lower part of the desulfurization device, so that a chemical reaction between gas-liquid may be efficiently performed.

Figure 2:
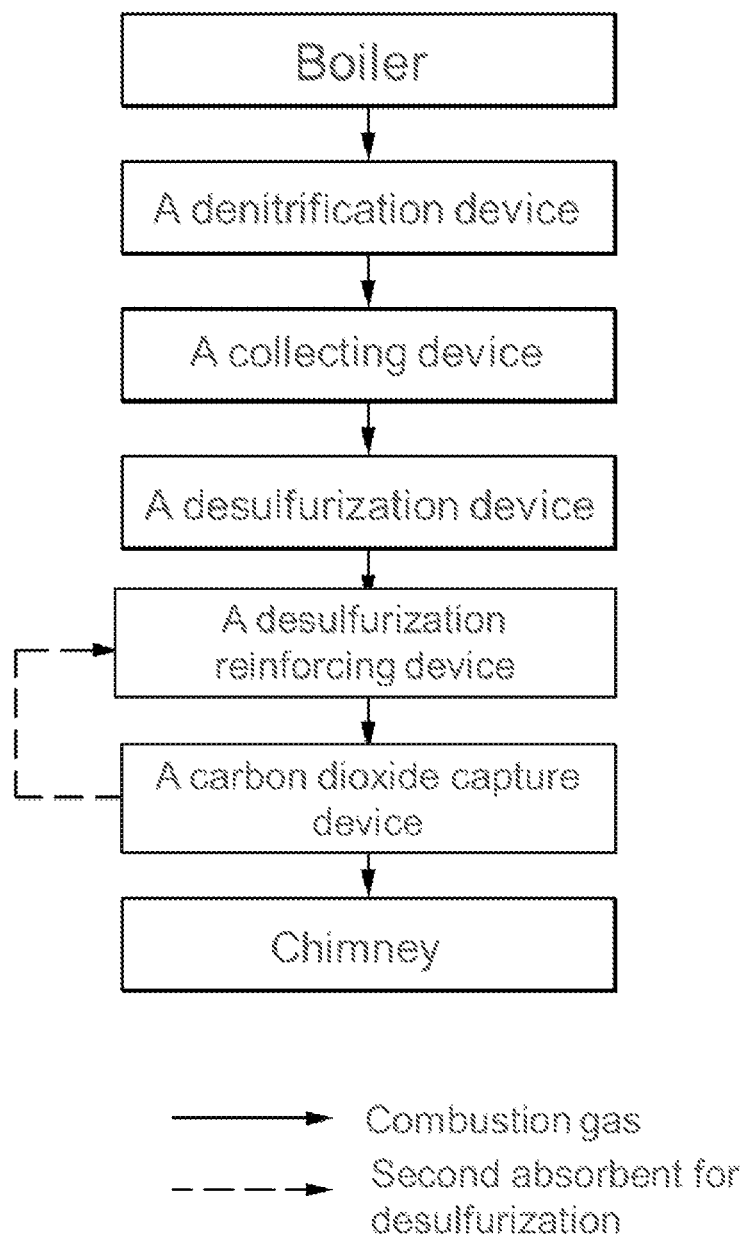
FIG. 2 illustrates each exemplary equipment of sequential process for treating combustion gas according to another exemplary embodiment of the present invention.

In another exemplary embodiment, FIG. 2 illustrates each equipment of sequential process for treating combustion gas according to another exemplary embodiment of the present invention. As shown in FIG. 2, the combustion gas discharged from a boiler may be moved to a denitrification device to perform a denitrification process of removing nitrogen compounds from the combustion gas. Then, the combustion gas obtained after removing the nitrogen compound may be moved to a collecting device to collect the combustion gas. Subsequently, the collected combustion gas may be moved to a desulfurization device to perform a desulfurization process of removing minor components including a sulfur-containing compound from the combustion gas. After the desulfurization process, the combustion gas obtained after removing the minor components may be moved to a desulfurization reinforcing device to perform a desulfurization reinforcing process of further removing the minor components including the sulfur-containing compound.

Subsequently, the combustion gas obtained after further removing the minor components may be moved to a carbon dioxide capture to perform a carbon dioxide capture process of capturing carbon dioxide from the combustion gas. Thereafter, the captured carbon dioxide may be compressed and stored, while the combustion gas is discharged through a chimney into the air. In addition, when the absorbent for desulfurization absorbs the minor components and is solidified after the desulfurization reinforcing process, the solidified absorbent may be collected and then, burned and discarded.

In an exemplary embodiment, in the desulfurization reinforcing process, a first absorbent for desulfurization may be used to primarily remove minor components from the combustion gas, and a second absorbent for desulfurization may be used to repeatedly remove the minor components from the combustion gas. The second absorbent for desulfurization may be the above-mentioned absorbent for desulfurization. When the absorbent for the desulfurization process according to one exemplary embodiment is used in the desulfurization reinforcing process, other minor components remaining in the combustion gas may be further removed after the minor components such as $SO_2$, $O_2$, halogens, and the like are primarily removed through the former desulfurization process. Accordingly, toxic materials remaining in the combustion gas may be efficiently removed.

The second absorbent for desulfurization may be separately prepared and flow into the desulfurization reinforcing device likewise the above absorbent for desulfurization. In addition, the second absorbent for desulfurization reinforcing process may be the carbon dioxide absorbent byproduct discharged from the carbon dioxide capture device and moved to the desulfurization reinforcing device as shown with the dotted arrow line in FIG. 2. Accordingly, the carbon dioxide absorbent byproduct produced in the carbon dioxide capture process may be reused and secure economical operation for treating combustion gas. The carbon dioxide absorbent byproduct may be obtained, since a part of components of the carbon dioxide absorbent is volatilized or deteriorated and lost when the carbon dioxide capture process is performed for a predetermined period as aforementioned.

When the first and second absorbents for desulfurization absorb minor components and are solidified after the desulfurization process, the solidified absorbents may be taken in a liquid/solid separation method from at the bottom of the desulfurization device or at the bottom of the desulfurization reinforcing device. In particular, the solidified first and second absorbents for desulfurization may sink down due to gravity and may be collected as a slurry-like solid, and the solid is taken through filtration and then, burned and discarded. Furthermore, the obtained solid absorbents as above may have purity of greater than or equal to about 90% and further be used as a raw material for a fertilizer or a chemical product.

Hereinafter, the exemplary embodiments are illustrated in more detail with reference to examples. These examples, however, should not in any sense be interpreted as limiting the scope of the present invention. Furthermore, what is not described in this disclosure may be sufficiently understood by those who have knowledge in this field and will not be illustrated here.

Example 1

An absorbent for desulfurization consisting of 16 wt % of potassium carbonate ($K_2CO_3$), 10 wt % of 2-methyl piperazine, and 74 wt % of water was used.

Example 2

An absorbent for desulfurization consisting of 15 wt % of potassium carbonate ($K_2CO_3$), 2 wt % of 2-methyl piperazine, and 83 wt % of water was used.

Comparative Example 1

An absorbent for desulfurization consisting of 20 wt % of potassium carbonate ($K_2CO_3$) and 80 wt % of water was used.

Comparative Example 2

An absorbent for desulfurization consisting of 15 wt % of 2-methyl piperazine and 85 wt % of water was used.

Comparative Example 3

An absorbent for desulfurization consisting of 17 wt % of potassium carbonate ($K_2CO_3$), 10 wt % of 2-methyl piperazine, and 73 wt % of water was used.

Comparative Example 4

An absorbent for desulfurization consisting of 16 wt % of potassium carbonate ($K_2CO_3$), 11 wt % of 2-methyl piperazine, and 73 wt % of water was used.

Comparative Example 5

An absorbent for desulfurization consisting of 15 wt % of calcium hydroxide (Ca OH)$_2$ and 85 wt % of water was used.

Comparative Example 6

An absorbent for desulfurization consisting of 15 wt % of sodium hydroxide (NaOH) and 85 wt % of water was used.

Comparative Example 7

An absorbent for desulfurization consisting of 16 wt % of calcium hydroxide ($Ca(OH)_2$), 10 wt % of 2-methyl piperazine, and 74 wt % of water was used.

Evaluation 1: Desulfurization Performance Analysis

The absorbents for desulfurization according to Examples 1 and 2 and Comparative Examples 1 to 7 were respectively placed in a reactor, and 3000 ppm of a $SO_2/N_2$ mixed gas was injected into the reactor until the absorbents reached equilibrium to perform a test removal reaction. At this time, the $SO_2/N_2$ mixed gas was injected at a temperature of 40° C. under a pressure of 1.02 atm at a speed of 0.01 Nm$^3$/h. In addition, the absorbents for desulfurization had a liquid temperature of 40° C. and a liquid volume of 1 L. The concentration of $SO_2$ discharged after each reaction was provided in the following Table 1.

The absorbents for desulfurization according to Comparative Examples 3 and 4 had separated layers (an upper layer was yellow liquid, and a lower layer was colorless liquid) and were not be used.

In Table 1, for the absorbents for desulfurization according to Examples 1 and 2, a substantially low concentration of $SO_2$ was discharged. Thus, the test results shows remarkably improved desulfurization performance of the Examples 1 and 2 compared to the absorbents for desulfurization of Comparative Examples 1 and 2 which use only either one of potassium carbonate and hindered cyclic amine.

In addition, the absorbent for desulfurization of Example 2 included a promoting agent in smaller amount than the absorbent for desulfurization according to Example 1, since a carbon dioxide absorbent byproduct was reused as an absorbent for desulfurization in Example 2. Since desulfurization performance was also remarkably improved when this carbon dioxide absorbent byproduct was reused, a carbon dioxide absorbent used in a carbon dioxide capture process may be reused for a desulfurization process. Therefore, reuse of such carbon dioxide absorbent may provide efficient operation of a carbon dioxide capture process and may prevent performance degradation during the long term operation, thereby providing economical operation.

In addition, when the absorbents for desulfurization of Comparative Examples 5 to 7 were used, a sulfate salt was produced, while $SO_2$ was removed. However, the sulfate salt produced in Examples 1 and 2 was highly soluble and thus, reusable in water. To the contrast, solubility of the sulfate salt produced in Comparative Examples 5 to 7 was substantially low, therefore, the sulfate salt thereof may not be reusable as a raw specimen. In particular, as for the absorbents for desulfurization of Comparative Examples 5 and 6, performance degradation may not be difficult to prevent during a long term operation of a carbon dioxide capturing process, since a carbon dioxide absorbent used for the carbon dioxide capturing process might not be reused in a desulfurization process.

TABLE 1

| | Absorbent composition for desulfurization | | | Concentration | |
|---|---|---|---|---|---|
| | Neutralizer (wt %) | Promoting agent (wt %) | Water (wt %) | (ppm) of discharged $SO_2$ | |
| Example 1 | potassium carbonate 16 | 2-methyl piperazine 10 | 74 | 0 | $K_2SO_4$ formation |
| Example 2 | potassium carbonate 15 | 2-methyl piperazine 2 | 83 | 3 | $K_2SO_4$ formation |
| Comparative Example 1 | potassium carbonate 20 | 0 | 80 | 140 | $K_2SO_4$ formation |
| Comparative Example 2 | 0 | 2-methyl piperazine 15 | 85 | 540 | |
| Comparative Example 3 | potassium carbonate 17 | 2-methyl piperazine 10 | 73 | — | Layer separation of absorbent for desulfurization |
| Comparative Example 4 | potassium carbonate 16 | 2-methyl piperazine 11 | 73 | — | Layer separation of absorbent for desulfurization |
| Comparative Example 5 | calcium hydroxide 15 | 0 | 85 | 0 | $CaSO_4$ generation |
| Comparative Example 6 | sodium hydroxide 15 | 0 | 85 | 0 | $Na_2SO_4$ generation |
| Comparative Example 7 | calcium hydroxide 16 | 2-methyl piperazine 10 | 74 | 0 | $CaSO_4$ generation |

White $K_2SO_4$ solid slurry was formed after the removal reaction in Examples 1 and 2 and Comparative Examples 1 and 2.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of treating combustion gas, comprising:
   a denitrification process of removing nitrogen compounds from the combustion gas;
   a collecting process of collecting the combustion gas obtained after removing the nitrogen compounds;
   a desulfurization process of removing minor components including sulfur-containing compounds from the collected combustion gas by using an absorbent for desulfurization; and
   a carbon dioxide capture process of capturing carbon dioxide using a carbon dioxide absorbent from the combustion gas obtained after removing the minor components,
   wherein the absorbent for desulfurization includes 15 to 16 wt % of potassium carbonate ($K_2CO_3$), 2 to 10 wt % of a promoting agent, and a balance amount of water, and wherein the promoting agent comprises hindered cyclic amine, hindered cyclic amine bicarbonate, or a combination thereof;
   obtaining a carbon dioxide absorbent byproduct after the carbon dioxide capture process is performed for a predetermined period.

2. The method of claim 1, wherein the hindered cyclic amine bicarbonate is selected from the group consisting of: 1-amino-4-methyl piperazinium bicarbonate, 1-(2-aminoethyl)-4-methyl piperazinium bicarbonate, 1-(2-hydroxyethyl)-4-methyl piperazinium bicarbonate, 1-(2-aminoethyl) piperazinium bicarbonate, 1-(2-hydroxyethyl) piperazinium bicarbonate, 2-aminoethyl piperazinium bicarbonate, 1-ethyl piperazinium bicarbonate, 2,5-dimethyl piperazinium bicarbonate, cis 2,6-dimethyl piperazinium bicarbonate, 1,4-dimethyl piperazinium bicarbonate, trans 2,5-dimethyl piperazinium bicarbonate, 1-methyl piperazinium bicarbonate, 2-methyl piperazinium bicarbonate, 1-ethyl piperazinium bicarbonate, 2-piperidinium ethanol bicarbonate, 3-piperidinium ethanol bicarbonate, 4-piperidinium ethanol bicarbonate, 2-aminoethyl-1-piperidinium bicarbonate, homopiperazinium bicarbonate, and a combination thereof.

3. The method of claim 1, wherein the hindered cyclic amine is selected from the group consisting of: 1-amino-4-methyl piperazine, 1-(2-aminoethyl)-4-methyl piperazine, 1-(2-hydroxyethyl)-4-methyl piperazine, 1-(2-aminoethyl) piperazine, 1-(2-hydroxyethyl) piperazine, 2-aminoethyl piperazine, 1-ethyl piperazine, 2,5-dimethyl piperazine, cis 2,6-dimethyl piperazine, 1,4-dimethyl piperazine, trans 2,5-dimethyl piperazine, 1-methyl piperazine, 2-methyl piperazine, 1-ethyl piperazine, 2-piperidine ethanol, 3-piperidine ethanol, 4-piperidine ethanol, 2-aminoethyl-1-piperidine, homopiperazine, and a combination thereof.

4. The method of claim 1, wherein the carbon dioxide absorbent comprises about 1 to about 16 wt % of a compound containing alkali metal; about 0.1 to about 10 wt % of hindered cyclic amine; and a balance amount of water;
   wherein the compound containing alkali metal is selected from the group consisting of potassium carbonate ($K_2CO_3$), sodium carbonate ($Na_2CO_3$), sodium hydroxide (NaOH), potassium hydroxide (KOH), potassium bicarbonate ($KHCO_3$), sodium bicarbonate ($NaHCO_3$), and a combination thereof.

5. The method of claim 4, wherein the hindered cyclic amine is selected from the group consisting of: 1-amino-4-methyl piperazine, 1-(2-aminoethyl)-4-methyl piperazine, 1-(2-hydroxyethyl)-4-methyl piperazine, 1-(2-aminoethyl) piperazine, 1-(2-hydroxyethyl) piperazine, 2-aminoethyl piperazine, 1-ethyl piperazine, 2,5-dimethyl piperazine, cis 2,6-dimethyl piperazine, 1,4-dimethyl piperazine, trans 2,5-dimethyl piperazine, 1-methyl piperazine, 2-methyl piperazine, 1-ethyl piperazine, 2-piperidine ethanol, 3-piperidine ethanol, 4-piperidine ethanol, 2-aminoethyl-1-piperidine, homopiperazine, and a combination thereof.

* * * * *